United States Patent
Mostofi et al.

(10) Patent No.: US 11,658,362 B2
(45) Date of Patent: May 23, 2023

(54) TRACTION BATTERY SYSTEM FOR A MOTOR VEHICLE

(71) Applicant: Dr. Ing. h.c. F. Porsche Aktiengesellschaft, Stuttgart (DE)

(72) Inventors: Sascha Mostofi, Zeltingen (DE); Christopher Volkmer, Niefern-Öschelbronn (DE); Philipp Kellner, Rennigen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 206 days.

(21) Appl. No.: 17/061,697

(22) Filed: Oct. 2, 2020

(65) Prior Publication Data

US 2021/0119190 A1    Apr. 22, 2021

(30) Foreign Application Priority Data

Oct. 22, 2019  (DE) ..................... 10 2019 128 476.7

(51) Int. Cl.
*H01M 50/204* (2021.01)
*H01M 50/242* (2021.01)
*H01M 50/249* (2021.01)

(52) U.S. Cl.
CPC ....... *H01M 50/204* (2021.01); *H01M 50/242* (2021.01); *H01M 50/249* (2021.01); *H01M 2220/20* (2013.01)

(58) Field of Classification Search
None
See application file for complete search history.

(56) References Cited

U.S. PATENT DOCUMENTS

| | | |
|---|---|---|
| 9,016,765 B1 | 4/2015 | Rawlinson |
| 2007/0224498 A1 | 9/2007 | Kim et al. |
| 2009/0325049 A1 | 12/2009 | Niedzwiecki et al. |
| 2011/0000729 A1* | 1/2011 | Schwarz ............... H01M 50/20 180/68.5 |
| 2012/0164496 A1 | 6/2012 | Lachenmeier et al. |
| 2012/0301770 A1 | 11/2012 | Schaefer et al. |

(Continued)

FOREIGN PATENT DOCUMENTS

| | | |
|---|---|---|
| DE | 102009007422 A1 | 8/2010 |
| DE | 102010020309 A1 * | 12/2010 .......... H01M 2/1083 |

(Continued)

OTHER PUBLICATIONS

Japanese Notification of Reason for Rejection for Japanese Application No. 2020-170323, dated Oct. 5, 2021, with translation, 8 pages.

(Continued)

*Primary Examiner* — Gregg Cantelmo
(74) *Attorney, Agent, or Firm* — RatnerPrestia

(57) ABSTRACT

A traction battery system for a motor vehicle includes a traction battery, which is designed such that it can be nonmovably received in a body of the motor vehicle, and a protective structure, which is arranged between the traction battery and a roadway, wherein the protective structure is connected to the traction battery by a fixing system. The fixing system is a releasable fixing system designed to have a female element and a male element, wherein the female element and the male element are designed to produce a form-fitting connection with one another.

11 Claims, 1 Drawing Sheet

(56) References Cited

U.S. PATENT DOCUMENTS

2015/0035370 A1    2/2015  Wyatt et al.
2017/0144566 A1    5/2017  Aschwer et al.
2018/0102576 A1*  4/2018  Yamamoto ............ H01M 50/20
2018/0294503 A1  10/2018  Hoefler et al.
2019/0237725 A1   8/2019  Kawaguchi et al.

FOREIGN PATENT DOCUMENTS

| | | |
|---|---|---|
| DE | 102010020309 A1 | 12/2010 |
| EP | 3070763 A1 | 9/2016 |
| JP | 2012119131 A | 6/2012 |
| JP | 2014013687 A | 1/2014 |
| JP | 2018029418 A | 2/2018 |
| JP | 2018125192 A | 8/2018 |
| JP | 2019129143 A | 8/2019 |
| JP | 2019133867 A | 8/2019 |
| KR | 1020120058043 A | 6/2012 |

OTHER PUBLICATIONS

English Translation of the Chinese Office Action for Chinese Application No. 202010961027.2, dated Jan. 13, 2023, 2 pages.

* cited by examiner

TRACTION BATTERY SYSTEM FOR A MOTOR VEHICLE

CROSS-REFERENCE TO RELATED APPLICATION

This application claims priority to German Patent Application No. 10 2019 128 476.7, filed Oct. 22, 2019, the content of such application being incorporated by reference herein in its entirety.

FIELD OF THE INVENTION

The invention relates to a traction battery system for a motor vehicle.

BACKGROUND OF THE INVENTION

All patent references identified herein are incorporated by reference in their entirety and for all purposes.

Traction battery systems for motor vehicles are known. What is concerned here is a plurality of battery modules having a plurality of battery cells which are designed for electric drive or partial drive in the form of a hybrid drive. The plurality of battery cells are bundled to form a battery module, with a plurality of battery modules being received in a battery housing of the traction battery. The traction battery is protected with respect to a roadway by means of a plate-shaped protective structure which is fixed by screwing on carrier elements, preferably crossmembers and longitudinal members of the battery housing.

Documents US 2007/224498 A1, US 2012/301770 A1 and US 2015/035370 A1 each disclose a traction battery which is composed of a plurality of battery cells, with the individual battery cells being connected to one another by means of a hook-and-loop closure or a Velcro fastening. US 2012/301770 A1 additionally discloses a heat-conducting plate which is arranged between two battery cells and is fastened to the battery cells by the hook-and-loop closure.

Document US 2018/294503 A1 and document US 2017/144566 A1 each disclose a traction battery system, wherein the battery cells are arranged between two tie-rod plates which serve to protect the battery cells particularly in the event of a collision.

U.S. Pat. No. 9,016,765 B1 discloses a traction battery system for a motor vehicle comprising a plurality of battery cells which are protected with respect to a roadway by means of a battery protection structure to avoid damage as a result of contact with the roadway. The battery protection structure is fixedly connected to the traction battery system by means of bolts on a surface thereof that is designed to face the roadway. A plurality of battery protection structures are provided to protect the traction battery.

SUMMARY OF THE INVENTION

Described herein is an improved, in particular installation-space-reduced, traction battery system for a motor vehicle.

Advantageous embodiments with expedient and nontrivial developments of the invention are specified in the respective claims.

A traction battery system according to aspects of the invention for a motor vehicle comprises a traction battery, which is designed such that it can be nonmovably received in a body of the motor vehicle, and a protective structure, which is arranged between the traction battery and a roadway. The protective structure is connected to the traction battery by means of a fixing system. According to the invention, the fixing system is a releasable fixing system, wherein the fixing system is designed to have a female element and a male element, wherein the female element and the male element are designed to produce a form-fitting connection with one another. That is to say, in other words, that the fixing system is formed from at least two parts, the female element and the male element, wherein these two parts can form a releasable, preferably repeatedly releasable, form-fitting connection. The advantage is an attachment of the protective structure to the traction battery that is optimized in terms of installation space and can be released quickly in a service situation. If for example a battery module of the traction battery has to be changed, the quickly releasable fixing system allows a quick, and hence cost-saving, demounting of the protective structure to be realized. Customary protective structures are attached to the direction battery or to a housing assigned to the traction battery by means of a plurality of screws or other nonrepeatedly releasable connection means whose release involves a very time-consuming operation. Even with a possible detachment of the protective structure as a result of overload, the proposed fixing system leads to a repeated attachment of the protective structure to the traction battery.

The fixing system is preferably designed in the form of a hook-and-loop closure or of a pressure closure. That is to say, in other words, that it is possible to repeatedly produce or release the connection between the protective structure and the traction battery with at the same time little expenditure of force being required both when releasing and when producing the connection. The advantage of a hook-and-loop closure or of a pressure closure avoids a local reduction of a so-called crash performance of the protective structure since, like for example in the case of a screw connection, no holes which form breakage starting points have to be formed in the protective structure.

In a further embodiment, the protective structure is plate-shaped in form, with the result that a minor extent of the protective structure in the direction of the body vertical axis can be brought about and accordingly a reduction in an overall height of the body of the motor vehicle can be realized. An as small as possible ground clearance of an underfloor of the body is preferably conceivable by virtue of the plate-shaped protective structure.

In order to ensure that the protective structure is received in a secured manner on the motor vehicle, it has on its circumference a collar for fixedly fastening the protective structure to the body and/or the traction battery. That is to say, in other words, that the protective structure can be connected at its circumference to the body particularly by means of the collar, which constitutes a type of flange. For secure connection, use can be made here of connecting elements, such as for example screws. However, by virtue of the fixing system, the number thereof can be reduced.

In a further embodiment of the traction battery system according to the invention, the protective structure has, on its bearing surface which is designed to face the traction battery, at least one load introduction element. A plurality of load introduction elements are preferably formed. These load introduction elements serve to take up forces acting on the protective structure from the direction of the roadway in order that a force on the traction battery is at least reduced, but preferably prevented.

To form a secure connection between the female element and the male element, the element mounted on the protective structure, namely the female element or the male element, is arranged on a web surface of the load introduction element that is designed to face the traction battery.

An integrally bonded connection of the female element and/or of the male element of the fixing system with the protective structure and/or the traction battery constitutes a connection between the components and the fixing system that is cost-effective and can be brought about quickly. A particularly cost-effective traction battery system can be realized with an integrally bonded connection by means of an adhesive.

In a further embodiment of the traction battery system according to the invention, the protective structure is fastened to a battery module of the traction battery. This means that a preferably small height of the traction battery system is formed since, on account of the direct attachment of the protective structure, it is possible to dispense with intermediate elements between the battery module and the protective structure. It is customary for the battery modules to be received in a battery housing of the traction battery, which battery housing, in addition to its lateral surfaces, has a cover plate which closes the housing to the top and a bottom plate which closes the housing to the bottom. To avoid damage to the battery modules, the bottom plates are configured to have a certain thickness so that connecting elements in the form of bolts or screws or rivets can form a secure connection between a protective element and the traction battery. By virtue of the fixing system, which, particularly in the case of a hook-and-loop closure, is configured not to penetrate into the bottom plate, the bottom plate can either be substantially reduced in its thickness or it can be dispensed with, as is achieved in the proposed embodiment. If the protective structure has at least one load introduction element, a so-called crash performance is at least maintained, even increased depending on the design of the load introduction elements, with a reduction in an overall height, and thus in an installation space, of the traction battery system.

In a further embodiment of the traction battery system according to the invention, fixing points of the fixing system are formed over a large area on the protective structure and the traction battery. That is to say, in other words, that fixing points of the fixing system are designed so as to be distributed, preferably uniformly, over a large area of the protective structure. One advantage is improved acoustics with a large-area distributed attachment of the protective structure to the traction battery by the fixing system, with the result that a vibration tendency and thus also a detachment of the protective structure are avoided.

It is thus possible to realize a cost-effective and installation space-optimized traction battery system for a motor vehicle in which, particularly in the case of a vehicle construction in which the battery modules are load-bearing and the battery case is dispensed with, the protective structure can be attached only at its edge region to the body, wherein a deformation of the protective structure in dependence on operating modes of the motor vehicle is prevented by virtue of the fixing system.

BRIEF DESCRIPTION OF THE DRAWING FIGURES

Further advantages, features and details of the invention will become apparent from the following description of preferred exemplary embodiments and with reference to the drawing. The features and combinations of features mentioned above in the description and also the features and combinations of features mentioned below in the description of the figures and/or shown in the figures alone can be used not only the respectively specified combination but also in other combinations or on their own without departing from the scope of the invention. Identical or functionally identical elements are assigned identical reference signs. In the drawing:

DETAILED DESCRIPTION OF THE INVENTION

Figure 1:
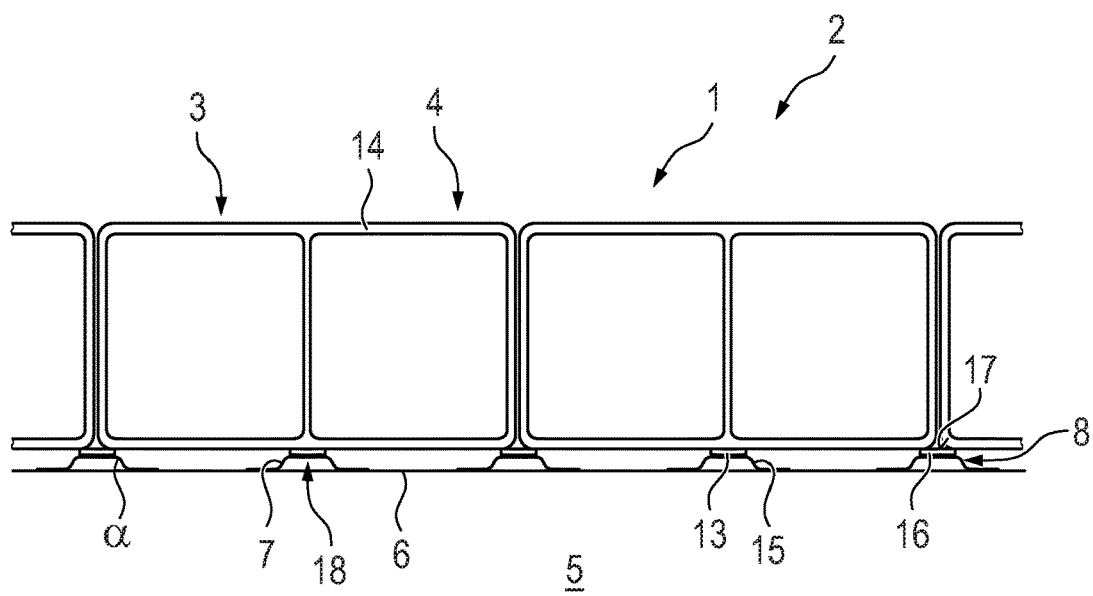
FIG. 1 shows a detail of a traction battery system in a cross section.

FIG. 1 depicts a cross section of a traction battery system 1 according to aspects of the invention for a motor vehicle 2 in a detail. The motor vehicle 2 has a body (not shown in more detail) which is designed to receive the traction battery system 1. A traction battery 3 of the traction battery system 1 comprises a plurality of battery modules 4 which each have a plurality of battery cells (not shown in further detail), wherein the plurality of battery cells are in each case received in a module housing 14 of the battery module 4.

The traction battery 3 is designed in the form of a cuboid, wherein, at least at its lateral surfaces and its upper side, which is designed to face the body, delimited by the body, said traction battery is received in a cavity of the body. In a further exemplary embodiment (not shown in further detail), the traction battery 3 has a battery housing which is designed to receive the battery modules 4.

On its underside, which is designed to face away from the upper side, the traction battery 3 is covered by means of a protective structure 6 with respect to a roadway. That is to say, in other words, that at least the protective structure 6 is arranged between the roadway and the traction battery 3. In the illustrated exemplary embodiment, the protective structure 6 is arranged directly on the module housing 14. However, if the traction battery 3 has a battery housing, said protective structure could also be arranged on its battery housing. It could equally also be possible for the traction battery 3, with or without a battery housing, to be placed in a receiving device of the body that completely encloses the traction battery 3 over its circumference, wherein the protective structure 6 is arranged on a surface of the receiving device that faces the roadway 5.

The protective structure 6 is of plate-shaped construction and has a plurality of load introduction elements 7 which have a u-shape-like or v-shape-like profile 8. For improved load adsorption, legs 15 of the load introduction elements 7 are preferably configured to be angled off relative to an element web 16 of the load introduction element 7 that is designed to face the traction battery 3 and interconnects the legs 15, wherein an angle α which has a value of more than 90° is formed between the element web 16 and the leg 15.

The protective structure 6 has a receiving plate 9 which bears the load introduction element 7 and which is bordered at its outer circumference by a collar 11 which is raised in the direction of the traction battery 3 with respect to a bearing surface 10 which has the load introduction elements 7. The collar 11 has a plurality of receiving openings 12 for receiving fastening means (not shown in further detail), preferably releasable fastening means, in particular screws.

Figure 2:
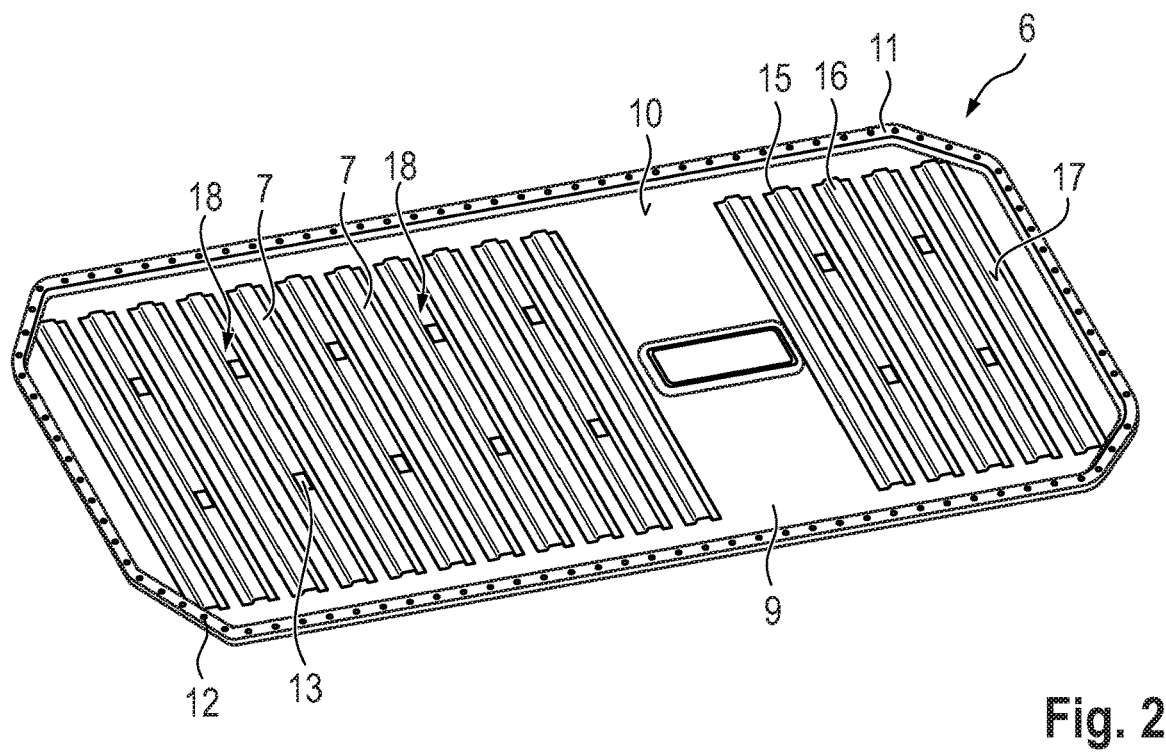
FIG. 2 shows a battery protection structure of the traction battery system in a perspective illustration.

In this exemplary embodiment illustrated in FIGS. 1 and 2, the protective structure 6 is fastened to the body of the motor vehicle 2 by way of the fastening means. This mode of fastening is preferably to be used in a vehicle construction in which the battery modules 4 are designed to be load-bearing and the battery housing which is designed to receive the battery modules 4 is dispensed with. It could equally also be possible for the protective structure 6 to be securely fastened to the battery module 4 or additionally to the body.

To avoid the protective structure 6 bending in the direction of the roadway 5, for example under relatively high operating loads of the motor vehicle 2, the protective structure 6 is attached to the battery modules 4 by means of a fixing system 13 which produces a releasable connection, wherein, in the present exemplary embodiment, the fixing system 13 is designed in the form of a hook-and-loop closure. The attachment of the protective structure 6 to the battery modules 4 leads to a reduction of an extent in the direction of a body vertical axis of the traction battery system 1 which is composed of the traction battery 3 and the protective structure 6. In a further exemplary embodiment (not shown in further detail), the fixing system 13 is realized in the form of a pressure closure.

The exemplary fixing systems 13 are fundamentally distinguished by the fact that one of the elements to be connected, namely the protective structure 6 and by way of example the battery module 4, has a female element of the fixing system 13, and the other element has a male element of the fixing system 13. That is to say in other words the battery module 4 can have either the female element or the male element and accordingly, to bring about the connection, the protective structure 6 can have the male element or the female element.

The fixing systems 13 are further distinguished by the fact that the female element is designed to be repeatedly releasably connected to the male element, resulting in a form-fitting connection between the female element and the male element. The form-fitting connection is disconnected under a certain input of force, with it being the case that, if there is no defect in the two elements and thus in the fixing system 13, it is possible for the connection to be restored.

The hook-and-loop closure 13 used in the present exemplary embodiment is designed in tape form, with the elements of the fixing system 13, namely the female element and the male element, being connected by means of an integrally bonded connection, preferably with an adhesive, to the corresponding components, namely the battery module 4 and the protective structure 6.

The element of the fixing system 13 that is mounted on the protective structure 6 can be fastened for example to the bearing surface 9 or to the load introduction element 7 in an integrally bonded manner. It goes without saying that it can also be fastened to the bearing surface 9 and the load introduction element 7. The element of the fixing system 13 that is mounted on the protective structure 6 is advantageously positioned on a web surface 17 of the element web 16 that is situated opposite the battery module 4.

To avoid a bending of the protective structure 6, the elements of the fixing system 13 are preferably provided in a central region of the receiving plate 9. The number of fixing points 18 of the fixing system 13 is dependent on a size of the protective structure 6 and on the bonding forces between the female element and the male element of the fixing system 13. The fixing points 18 of the fixing system 18 are formed over a large area on the protective structure 6 and the traction battery 3.

The element of the fixing system 13 that is situated opposite the protective structure 6 and is likewise configured in tape form in the present exemplary embodiment is likewise fastened to the battery module 4 with an adhesive. It can equally also be connected to the battery case, a battery bottom, a battery housing or a battery module housing. It is thus mounted on the battery side, preferably opposite the protective structure 6.

What is claimed:

1. A traction battery system for a motor vehicle, comprising:
   a traction battery configured to be nonmovably received in a body of the motor vehicle,
   a protective structure arranged between the traction battery and the body of the motor vehicle, wherein the protective structure is connected to the traction battery by a fixing system,
   wherein the fixing system is a releasable fixing system having a female element and a male element, and wherein the female element and the male element are configured to produce a form-fitting connection with one another, and
   a plurality of load introduction elements uniformly arranged on a bearing surface of the protective structure that faces the traction battery, each load introduction element comprising a top surface and two legs extending from the top surface, wherein each leg extends from the top surface at an obtuse angle and connects to the protective structure,
   wherein, for each load introduction element, the female element or the male element is arranged on the top surface of the load introduction element that faces the traction battery.

2. The traction battery system as claimed in claim 1, wherein the fixing system is a hook-and-loop closure.

3. The traction battery system as claimed in claim 1, wherein the protective structure is plate-shaped in form.

4. The traction battery system as claimed in claim 1, wherein the protective structure has on a circumference thereof a collar for fixedly fastening the protective structure to the body and/or the traction battery.

5. The traction battery system as claimed in claim 1, wherein, for each load introduction element, the female element and/or the male element of the fixing system are/is connected to the load introduction element and/or the traction battery in an integrally bonded manner.

6. The traction battery system as claimed in claim 5, wherein the integrally bonded connection is an adhesive.

7. The traction battery system as claimed in claim 1, wherein the protective structure is fastened to a battery module of the traction battery.

8. The traction battery system as claimed in claim 1, wherein fixing points of the fixing system are formed over an area on the protective structure and the traction battery.

9. The traction battery system as claimed in claim 4, wherein each load introduction element is spaced apart from the collar.

10. The traction battery system as claimed in claim 1, wherein the traction battery system comprises a housing including two spaces that are each sized to accommodate a battery cell, and an interior wall separating the two spaces, wherein one of the load introduction elements is positioned directly below the interior wall for supporting the interior wall.

11. The traction battery system as claimed in claim 1, wherein the traction battery system comprises a first housing containing battery cells, and a second housing containing battery cells, wherein one of the load introduction elements is positioned directly below adjacent walls of the first housing and the second housing for supporting the adjacent walls, and wherein the releasable fixing system is sandwiched between and connected to (i) said one of the load introduction elements and (ii) the adjacent walls of the first housing and the second housing.

* * * * *